Nov. 23, 1926.  1,608,478
C. FIELD
METAL CUTTING MACHINE
Filed Jan. 26, 1924   8 Sheets-Sheet 2
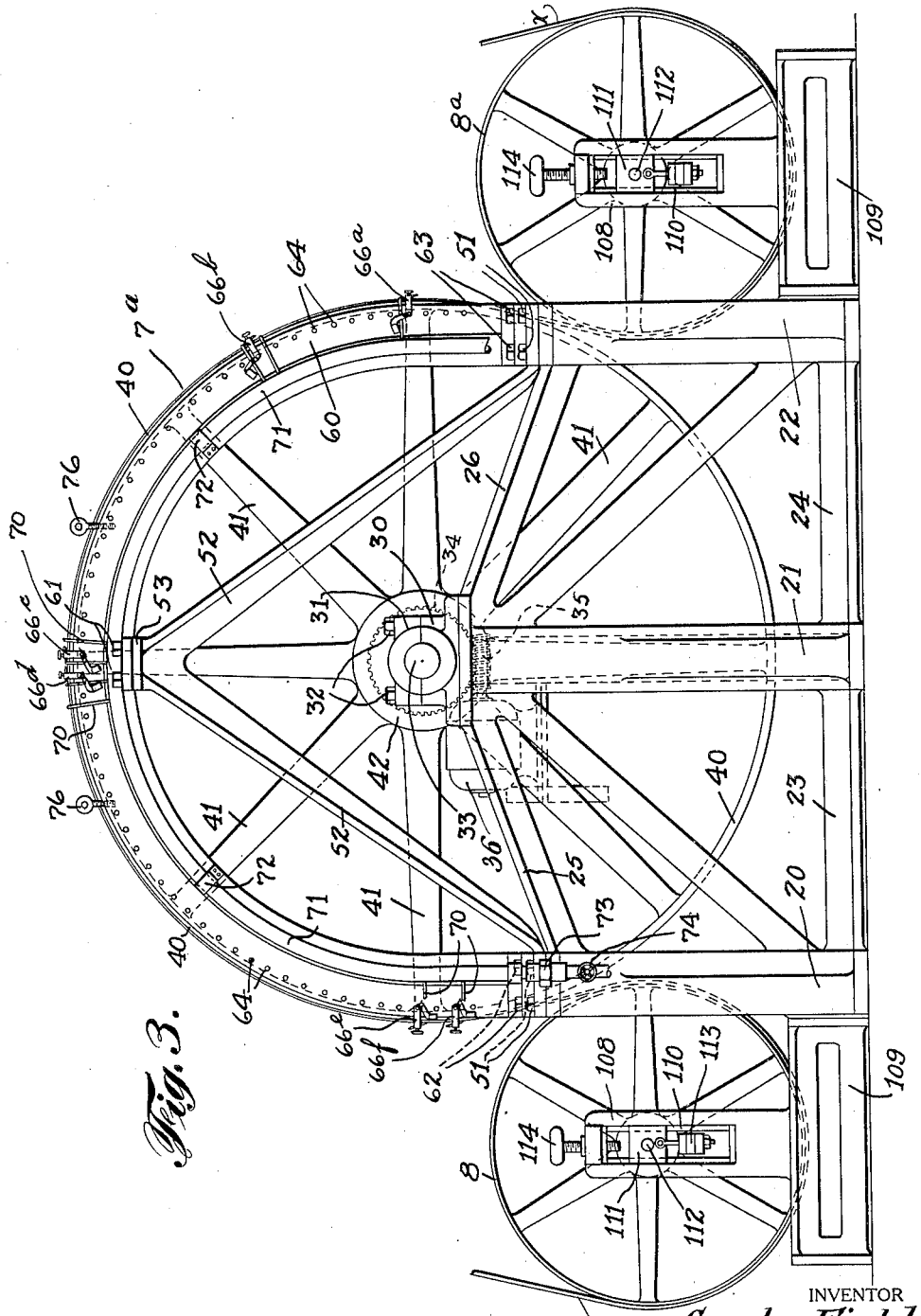
INVENTOR
Crosby Field
by George A. Shaw
his ATTORNEY

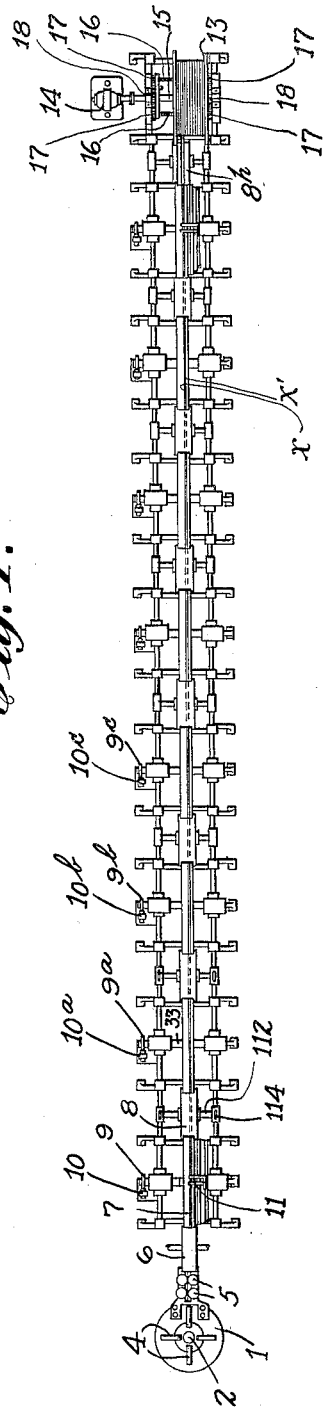

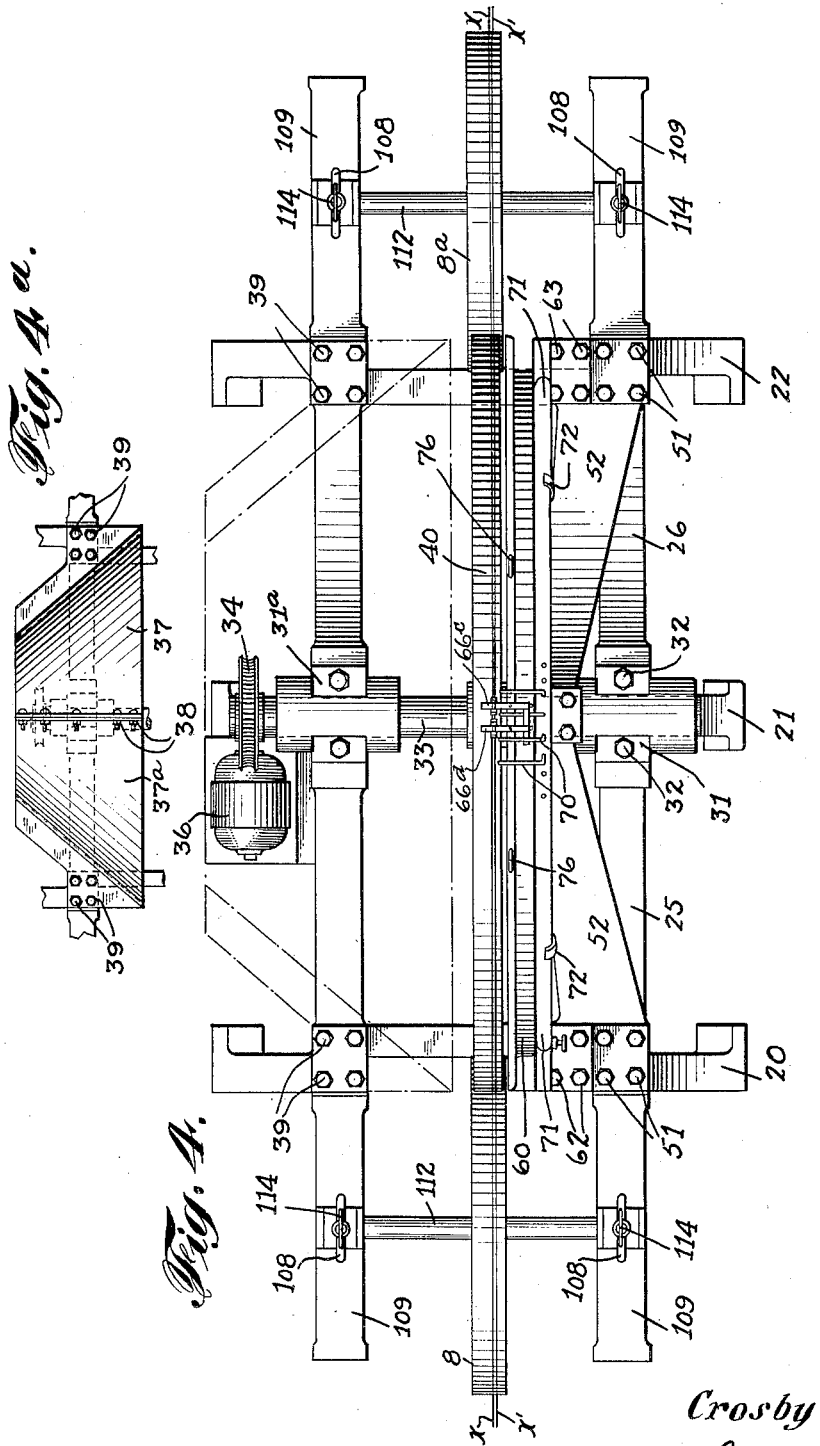

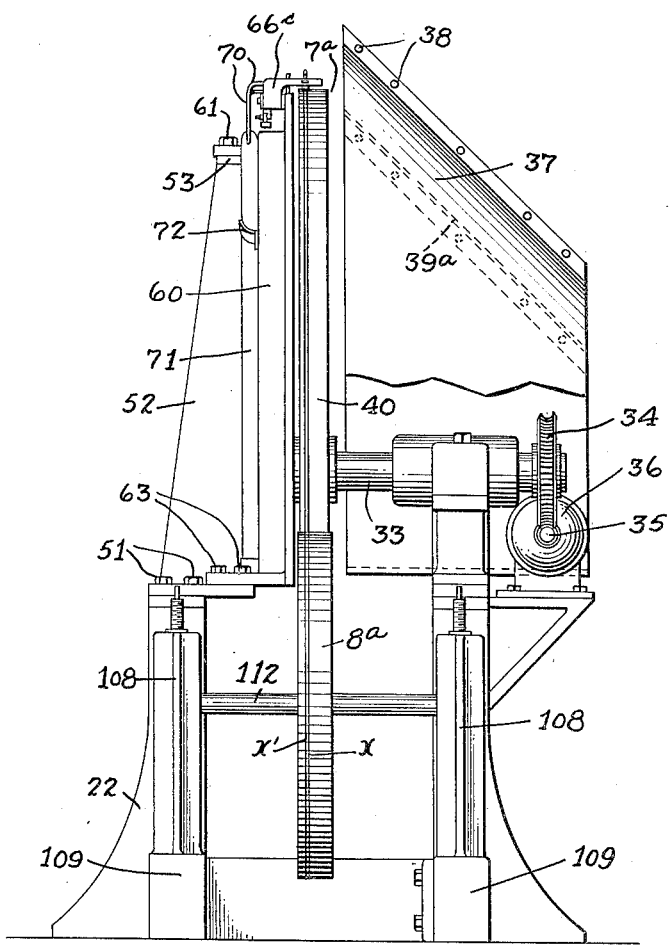

Nov. 23, 1926.
C. FIELD
METAL CUTTING MACHINE
Filed Jan. 26, 1924
1,608,478
8 Sheets—Sheet 5
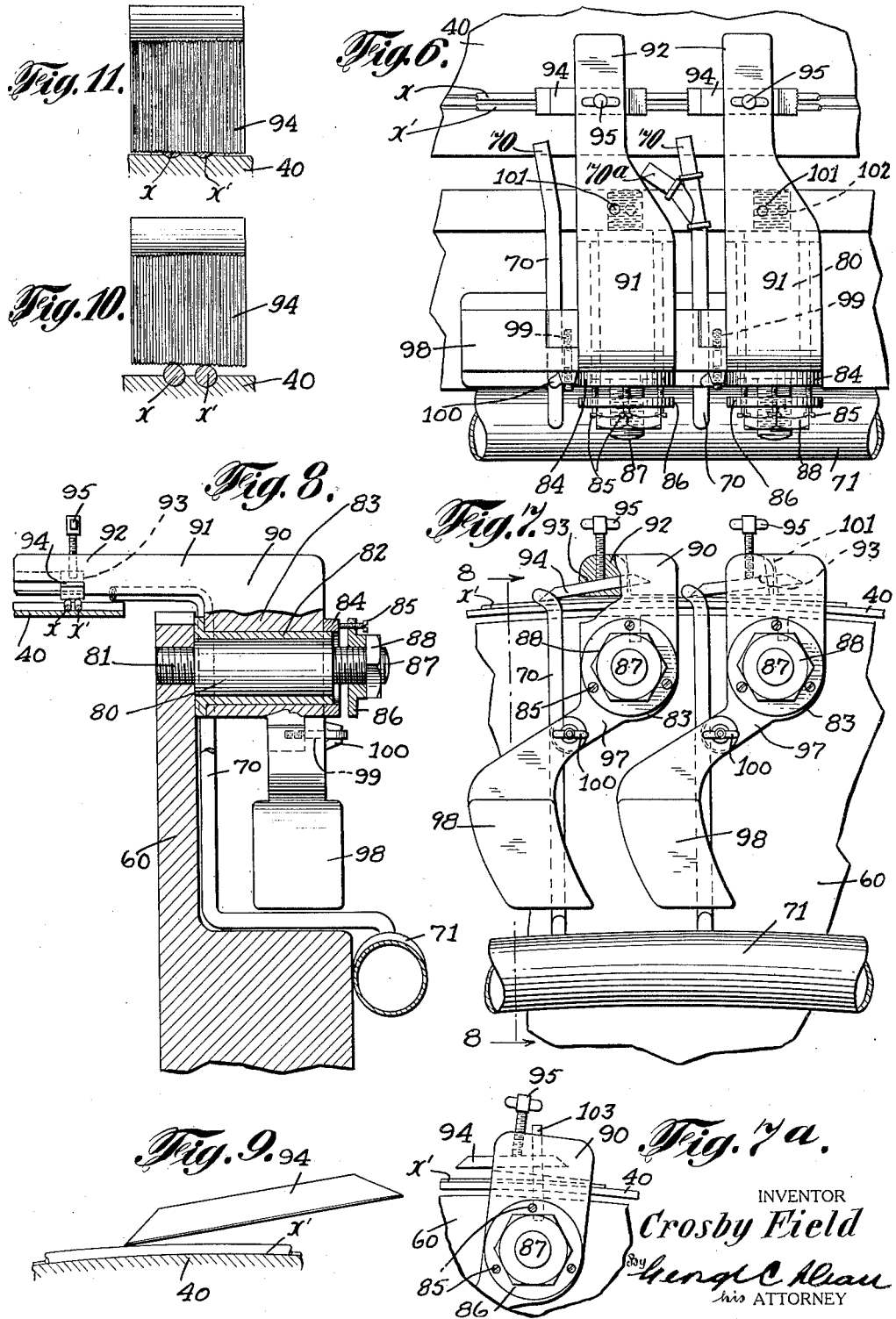
INVENTOR
Crosby Field
by George C. Shean
his ATTORNEY

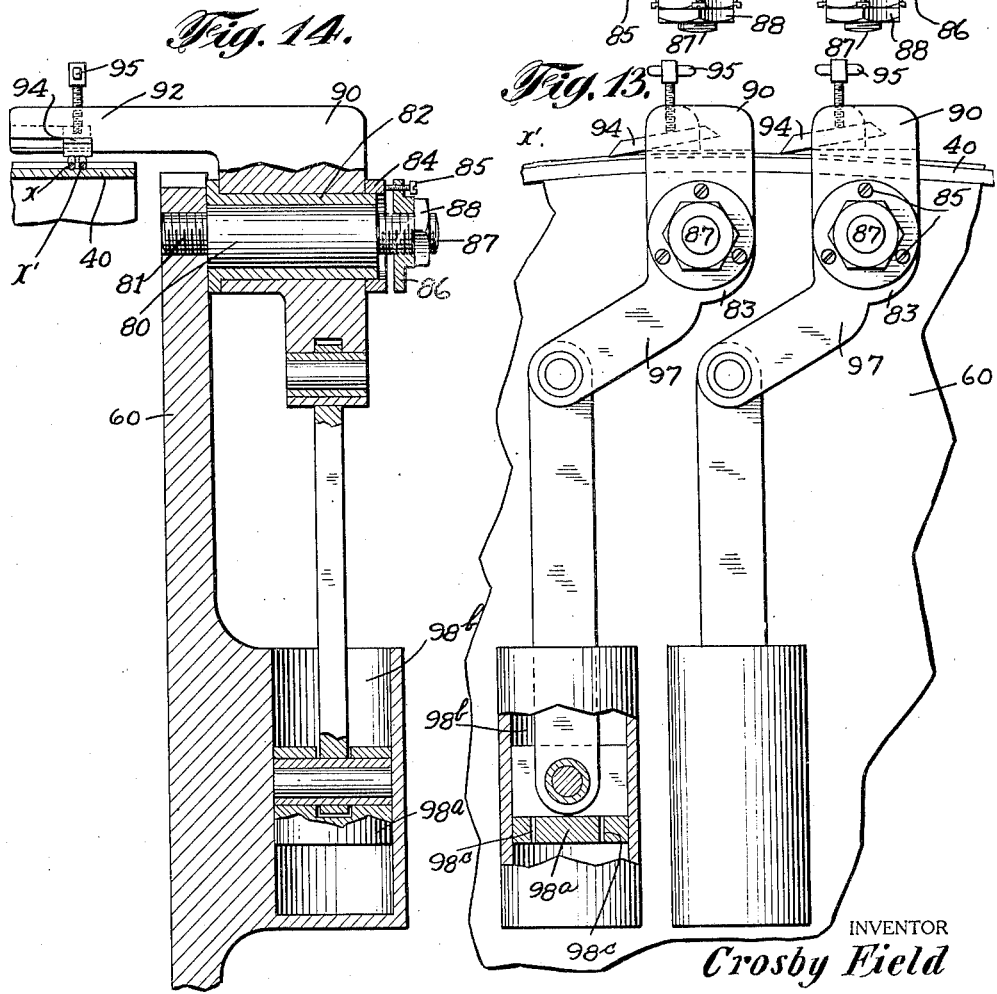

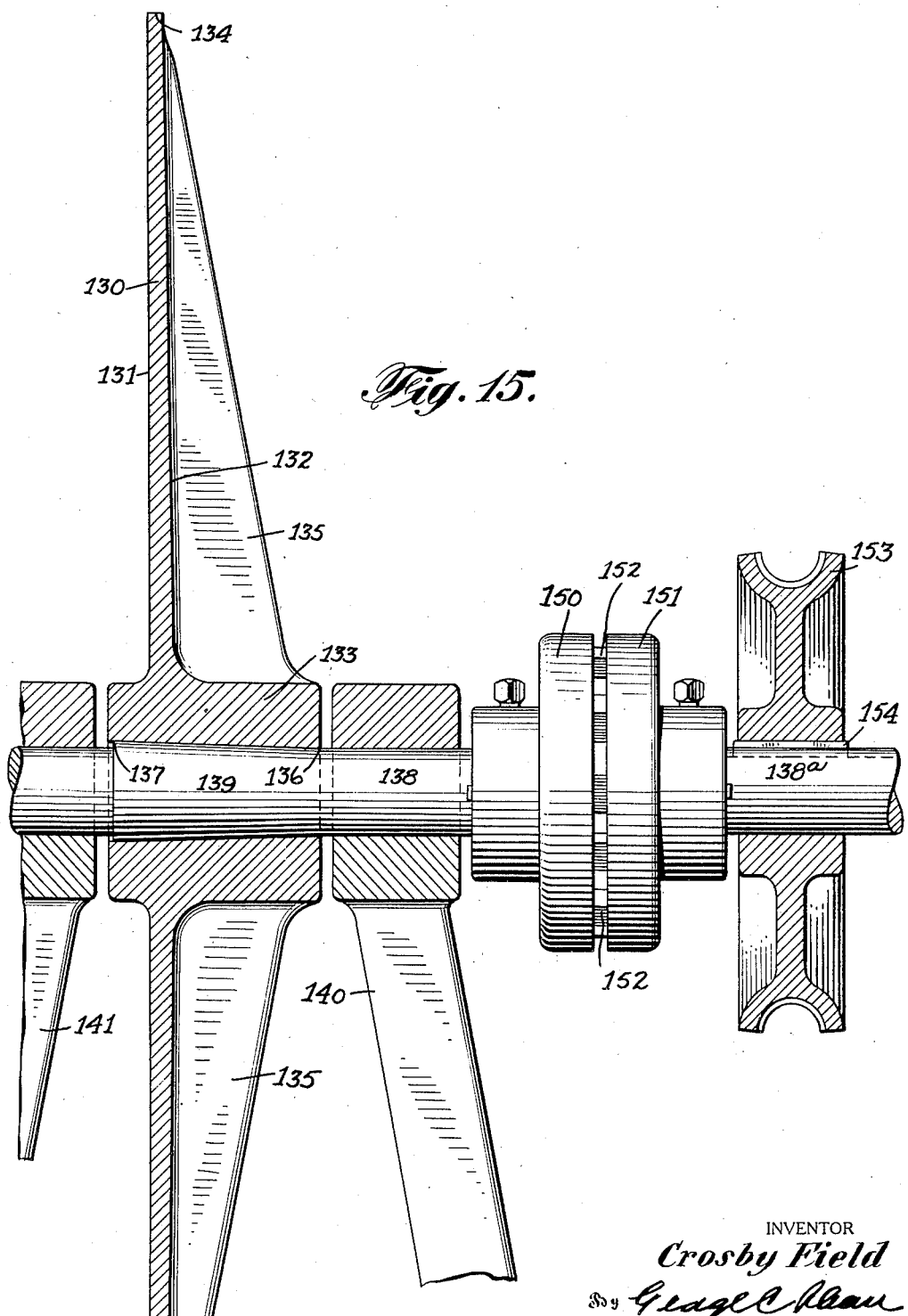

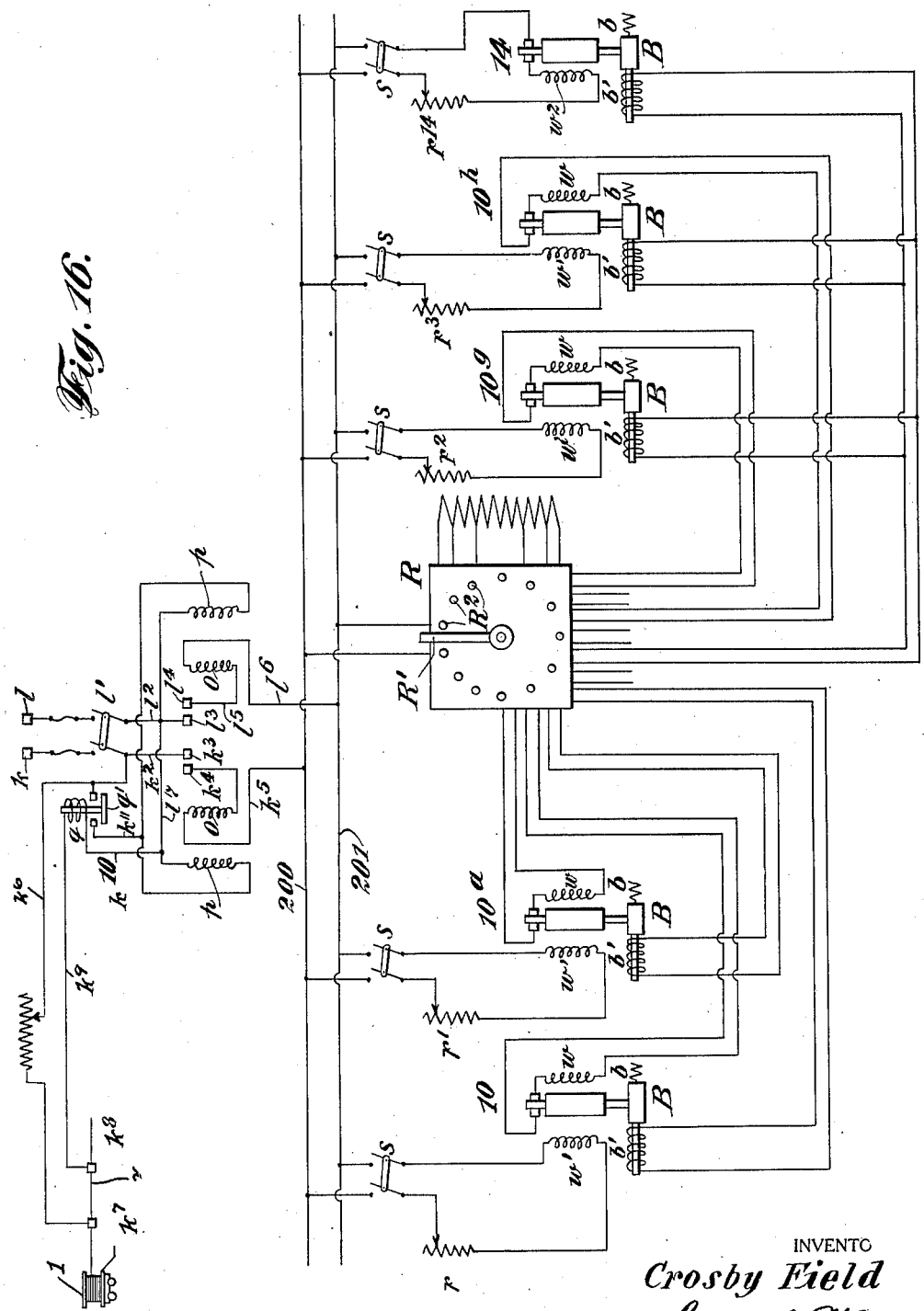

Patented Nov. 23, 1926.

1,608,478

UNITED STATES PATENT OFFICE.

CROSBY FIELD, OF BROOKLYN, NEW YORK.

METAL-CUTTING MACHINE.

Application filed January 26, 1924. Serial No. 688,660.

My present invention is shown as embodied in a machine for grooving metal, preferably steel, in such manner that the metal cut from the groove shall constitute tough, elastic, long-staple filaments or fibers, of extremely minute but relatively uniform section and presenting sharp edges and many of the novel features of my invention involve specific adaptations for this specific purpose. It will be found, however, that certain features of the invention are applicable for cutting operations other than grooving, or for operating on metals other than steel or for purposes other than producing the specific product above described.

The specific material which I prefer to employ is steel wire or rod material of circular cross-section such as is commonly supplied in bundle coils. Many features, even very specific features of the method are applicable to steel or other material in other forms, as, for instance, wires and rods or bands of metal that are triangular, rectangular, polygonal or other desired cross-section; and some of the features would be applicable to bars, plates or blocks that are not bendable.

For the preferred use and for producing the preferred fibrous or woolly material from cylindrical drawn wire or rods of bendable diameter, the invention involves close cooperative relation of many novel features and purposes.

In the present commercial art the machines most generally used for the above purposes consist essentially of a stationary bed, over which a wire is drawn by a power driven tractor reel or drum at one end, from a supply reel or drum at the other end. As the wire is dragged over the bed, it is guided and supported by tracks or grooves formed in the latter. A series of knives or cutters are arranged tandem along the bed, being accurately adjustable and rigidly clamped with respect to the latter. The operator of the machine must adjust each individual knife so that it will groove the wire to an accurately predetermined depth. The depth of cut being gauged by position of the knife with respect to the bed, each knife must be independently adjusted, each one slightly nearer the bed than the knife in advance of it. The work being done by end traction against friction on the stationary bed, but few knives can be used and many passes of the wire are necessary. Hence the machine is reversible and the operator must watch the machine and stop it at the end of each run, disconnecting the full drum from the source of power, connecting the empty drum with the source of power to serve as a tractor in the reverse direction and must apply a properly adjusted friction drag on said first mentioned drum, so as to keep the right tension on the wire. On each successive pass, every one of the knives must be readjusted closer to the bed and with the same accuracy as before. In all cases the angle as well as the depth of the cut must be adjusted. Whenever one of the knives becomes worn or broken, it must be renewed.

During the entire time, the operator must pluck away the wool from in front of each individual knife before it accumulates in any considerable mass, or otherwise it would tend to mat and clog the machine; also lubrication of the cutting edge of the knife where it bears upon the wire, must be attended to.

The above described methods necessitate considerable skill in order to produce the desired uniformity of product. The number of knives that can be attended to is limited by the ability of the individual operator, and it has been found that these vary greatly among themselves, even after many years of training. With the same amount of experience, one operator will cut two or three times the amount of product that can be cut by another upon the same machine. Even in the case of the most skilled operator, the maximum number of knives that can be attended to is comparatively small.

In its relation to the above common methods, my invention contemplates many improvements.

In place of a stationary bed requiring great tension on the wire to overcome friction on the bed, I employ a rotating power driven tractor wheel or drum, which relieves the wire of most of its tension, the bed friction becoming available for applying traction to the wire. In this arrangement, the surface of the tractor drum opposite each knife can afford all or a large part of the traction necessary to feed the wire against the cutting resistance of each said knife. Consequently, the number of knives that can be used in a tandem series all working successively on the same wire, can be increased to any desired extent without danger of rupturing the wire because there is no corresponding increase of end traction thereon.

The traction of the winding reel is reduced to that required to keep the wire in close frictional engagement with the tractor wheel bed and this is preferably regulated by an automatic constant tension drive. This may be through a friction clutch or a slipping belt or preferably by having electric motors driving the wheel bed and also the traction reel, with a series-parallel control system as hereafter described.

With a single large tractor bed wheel, say five feet to nine feet in diameter, twenty to sixty knives can be used; and in such case it becomes practical to have one direction operation by the use of supply and traction reels which are shifted from winding to supply positions after each pass. An important feature is multiplying the knives to an extent where a single pass of the wire will serve to shave off the wire down to breaking thinness and this may be four-fifths to nine-tenths or even more, of the total diameter of the wire. As a single wheel large enough for this purpose might prove cumbersome and expensive, I prefer a plurality of tractor wheel beds arranged in series, preferably with weighted idlers to take up slack between them. In a special case there may be, say, ten tractor wheels each eight or nine feet in diameter, having forty or fifty knives on each so that the wire may be used up in a single pass without the necessity for any reversing.

By using tractor wheel beds of such large diameter, very much heavier wire or rod material may be used, the apparent practical limit being the largest diameter that can be easily bent to follow the curvature of the tractor bed wheel and in the case of a nine-foot or even a five-foot wheel, quite heavy rod material could be used.

In this arrangement the tractor reel at the far end of the machine has to supply traction only sufficient to take up the slack, keep the wire in firm engagement with the tractor bed wheel, and equalize the rates of travel of all wheels in the series by automatically assisting those that tend to lag behind the others. Moreover, each wheel backward from the traction reel, operates in the same way as a tractor for any lagging wheel in the rear thereof.

One of the most strikingly original features involves somewhat paradoxical discoveries with reference to grooving of a wire by means of a knife edge having a multiplicity of very minute V shaped serrations, to produce relatively uniform, long staple fibers of triangular cross-section and very fine gauge, that is, near or above 1/1000 of an inch in thickness and up to, say, 1/32 of an inch or more, the most generally useful gauge being 2/1000 to 4/1000 inch. Heretofore long staple and uniform cross-section for the fiber has been supposed to depend upon rigid accuracy of the machining operation. Practically all the commercial product is now produced by clamping with utmost rigidity and gauging with utmost accuracy the desired adjsted position of the knife with respect to the bed which is engaged by the under surface of the wire.

Another but less practical method is to do the same rigid clamping and accurate gauging with reference a presser foot or roller that engages the top surface of the wire, just in advance of the knife. In the latter case the knife is just as rigidly related to the wire engaging presser foot, as it is to the bed, in the first case.

I have discovered, however, that serrated knives of this kind do not have to be adjusted or clamped in fixed relation to any gauge element, either bed or presser foot. They can be "floating," that is, pivoted or otherwise movably supported so that they are left free to make cuts of any depth whatever, even deep enough to sever the wire or break the knife and yet they automatically gauge their own operation for a desired depth, less than the depth of the serrations. Moreover the gauging of the depth of the cut and resulting thickness of the product, can be more accurate than when the knife is clamped to any gauge whether presser foot or bed of the machine. For instance, V shaped serrations approximately 5/1000 of an inch in depth can be made to automatically gauge their own operation in cutting fibers of any desired size between 2/1000 and 4/1000 inch, the precise gauge being determined by the weight or pressure applied to force the knife into the work. This is the more remarkable because geometrically considered, the knife is somewhat like a chisel with the bevel side away from the work and one would expect it to automatically dig into the wire either progressively so as to cut it off or intermittently so as to chatter.

I have discovered that the desired smooth, accurate operation by my "floating" or self gauging method, can be obtained with knives quite similar to those previously used as regards form and angle of bevel, provided movement of the knife is steadied by properly disposed inertia masses, preferably masses disposed in close rigid relation to the knife clamping point, in combination with means affording frictional damping of pivotal movements whereby the knife can change the depth of cut in the work. With proper arrangement of these essentials the depth of the cut can be gauged by adjusted constant pressure applied either by weights, springs or liquid and even by compressed air.

By suitable use of inertia and frictional damping as above described, vibratory movements are practically eliminated from the knife, but it is also important that the support for the wire which is being cut should also be free from vibration. Also irregularities of the bed, even slight ones, should be avoided because fractions of a thousandth may be important for the finer gauge product, or where the conditions are such as tend to make cumulative, any incipient irregularities in the cut surface of the wire upon which the knives operate.

For these and other reasons, it is highly desirable to have the wheel rotate in a vertical plane so that there will be no sag of the edge thereof. Also it should be of cast metal, carefully designed because as is well known, ordinary machined castings are liable to change shape and contour for long periods, sometimes one or two years after they are machined. Hence I prefer a disc having one face plane and the other face inclined so that the disc tapers slightly from the hub to the periphery; and to reinforce with deep radial webs also tapering toward the periphery. Accuracy practically forbids the ordinary keyed mounting on a cylindrical support shaft, and I use a drive-fit of the hub upon a fine-taper, coned shaft. The disc is also insulated from vibration by the use of a coupling between it and the motor, and the motor drives the shaft through a worm gear, thereby avoiding even the slight initial vibration that is unavoidable where spur gears are used.

The peculiarities of my automatically self gauging, or floating, knives makes it simple to arrange for raising or lowering each knife into or out of operation either individually or simultaneously. Moreover, no accurate adjustment with respect to the tractor wheel being required, all the knives of one wheel may be mounted upon a single support so that they may be all removed as a unit and the same or similar unit then applied in operative position without the necessity of any adjustment whatever for the individual knives. Obviously this non-adjusting replacement feature of the invention is applicable where the rotating wheel bed is not power driven and even where the bed is stationary, as in the present-day machine described above.

Another feature of my invention is removing the cut fibers from the cutting edge of the knife as fast as they are cut, preferably by a properly directed air blast. Such a blast may be directed so as to have an important cooling effect on the working edge of the knife. By properly regulating the force of this blast, it will operate non-positively on the filaments to gently draw them away from the cutter as fast as they are grooved out of the wire, thus preserving the product in the longest possible strands or filaments and depositing them in a loose fluffy mass facilitating subsequent handling, grading and packing of the product.

According to present practice, the material most used is wire of .106 inch diameter, obtainable in the market in bundle coil form, the lengths in the coils being quite variable, between, say, 3,000 feet and 9,000 feet, the more common length being around 7,000 feet. While wire of the same diameter or greater diameter may be found in all forms of my machine, I prefer not to use too large wire for the continuous machine wherein the wire is reduced to scrap thickness by a single pass, the size of the wire being determined partly by the practical limit of tractor wheel units that may be desirably employed in tandem or interdependent relation.

In all forms of the machine and particularly in the tandem, single-pass arrangement, the supply of the wire to the machine is kept continuous by electrically welding the end of a second coil to the tail end of the preceding one. In this way the effective length of the wire available is unlimited and, barring accidents, the machine may be run for almost any length of time without the necessity of rethreading the wire through the machine.

From the above it will be seen that as contrasted with prior methods, the work required of the operator is merely that of supervision. Metal working experience and skill in adjusting knives is no longer required; nor is removal of the cut product from the knives; nor is replacement of knives. The above described interchangeable gang-units are each fitted with a multiplicity of resharpened knives, by knife experts in a separate department. When knife replacement is necessary, one of these refitted units is quickly substituted. If anything goes wrong with one of the knives, the operator simply pivots it out of cutting relation to the wire. Where there are forty or sixty knives on one wheel, or where there are a total of 400 or 600 knives working on wheels in tandem, throwing out a few of the knives in this way produces no important or appreciable diminution of the product. If desired, individual blades thus thrown out can of course be replaced by an unskilled operator and without any interference with the operation of the machine. In many cases, however, the defective knives may remain out of operation until it comes time to remove the entire gang unit for resharpening. So the principal work of the operator is to see that the air jets are working properly, keep the tractions of the several bed wheels and the end traction of the winding reel properly coordinated to keep the weighted idlers floating on the slack loops between the tractor wheels. The supplying new bundle coils and welding them in continuous lengths is taken care of by a specialist in that line rather than by the operator.

It has been found that two wires can be run in parallel grooves so that the two wires are being simultaneously cut by the same knife blades. Preferably these wires are separated by about one-half diameter thereof so that in the above described size two of them may be amply covered by a blade one-half inch wide as against the present practice of using blades an inch wide on a single wire.

This represents another departure from the present practice, since the inch width of present blades is for the purpose of permitting lateral adjustment of the blade to bring fresh portions of the cutting edge into operation on the wire. By my above provisions for instantly replacing an entire gang of knives, I find that there is nothing to be gained and a good deal to be lost by lateral adjustment by the operator on the machine, and, on the other hand, by reducing the width of the knife from one inch to one-half inch or less I am able to have twice as many knives for use, sharpening and replacement, though the amount of money tied up in tool steel remains the same.

The above and other features of my invention may be more fully understood from the following description in connection with the accompanying drawings, in which Figs. 1 and 2 are respectively plan and side elevation of a complete machine, in which any or all novel features of my invention may be embodied;

Figs. 3, 4 and 5 are respectively side elevation, top plan and end elevation of one of the units comprising the machine shown in Figs. 1 and 2;

Fig. 4ª is a top plan view of the shield shown in dotted lines, Fig. 4, but on a smaller scale;

Fig. 6 is a top plan view and Figs. 7 and 7ª are side elevations showing details of two of the grooving knives;

Fig. 8 is a section on the line 8—8, Fig. 7, looking in the direction of the arrows;

Fig. 9 is a side elevation showing on a larger scale the angular forms and relations of one of the grooving knives with respect to the work;

Fig. 10 is a view from the right, Fig. 9, but on a scale twice as large;

Fig. 11 is a similar detail, but showing the relation of parts under the knife when the wire is nearly used up;

Figs. 12, 13 and 14 are respectively similar to Figs. 6, 7 and 8, but showing a modification;

Fig. 15 is a vertical section showing a preferred construction for the traction wheel and driving means of Figs. 1 and 2;

Fig. 16 is a diagram of circuits for series parallel control of the motors for driving the traction wheel units in coordination with the traction reel at the end of the machine.

The assembly shown in Figs. 1 and 2 comprises units to be described hereinafter. The organization of these units in a single machine adapted to reduce the wire to the scrapping point, in one pass through the machine, depends upon the novel features of the units whereby knives may be sufficiently multiplied to make this possible. Deferring description of these units and considering Figs. 1 and 2, it will be seen that 1 is a supply reel, rotating on shaft 2, subject to drag imposed by the friction of arms 4 on the end of the reel. The wire from the reel is drawn through straightening rolls 5; under guide-roller 6, over traction wheel 7, under vertically slidable gravity roller 8, thence over the next traction wheel 7ª of the second unit, which may be of exactly the same construction as the unit 7. The traction wheel 7 is driven through a worm wheel 9 by motor 10, while the weight of roller 8, together with the end tractions from the far end of the machine, holds the wire in firm contact with the periphery of said traction wheel 7.

As indicated in Fig. 3, the weighted rollers 8, 8ª, etc., shown in Fig. 1 may be in the form of wheels. Each wheel is slidably mounted in standard 108 on base 109. The standard has a slot containing four operating vertical guides 110 for a journal box 111 carrying one end of shaft 112 on which the wheel 8 is mounted. The other end of the wheel is similarly supported in a similar standard. These slides permit the gravity rollers 8 on the wire $x$ to ride suspended in a downward loop of said wire which is thus automatically tensioned to take up and yield slack of a length equal to twice the play of the journal box 111 on the guides 110. The journal box may be equipped with adjustable weights 113 to compensate for various desired values for the end traction on the wire. A screw, 114, may be provided for adjustably limiting the upward movement of the journal box 111, and a rubber or spring buffer may also be employed for the same purpose.

Around the upper half of the traction wheel, are knives as 11, 11. The traction wheel is of very large diameter, so that its curvature adjacent each individual knife is not much different from that of the curved stationary beds now in common use, that is, so far as concerns the proper functioning of the knife.

In the form diagrammatically indicated in these Figures 1 and 2, there are eight tractor wheels, 7, 7ª, 7ᵇ, 7ᶜ, etc., with eight intermediate weighted wheels 8, 8ᵃ, 8ᵇ, 8ᶜ, etc., and each of these tractor wheels is driven through a worm wheel as 9, 9ᵃ, 9ᵇ, 9ᶜ, etc., by motors as 10, 10ᵃ, 10ᵇ, 10ᶜ, etc. At the far end of the machine the wire from the last weighted wheel 8ʰ passes up over a guide wheel 12 and over to the far side of reel 13 which is rotated in the direction of the arrow by motor 14, preferably series wound, so as to have a constant-torque tendency. This reel 13 is caused to traverse back and forth axially for close winding of the wire in helical layers with adjacent sides of the wire in contact. Any desired mechanism may be used for causing such traverse of the drum, and as such mechanisms are well known, it is sufficient to indicate in this diagram that the drum is slidable on shaft 15 and is screwed transversely by screw shafts 16, 16, carrying gears 17, 17, which have a planetary movement around stationary gear 18, whereby the screws 16 are rotated in proper ratio to the revolutions of the drum, said ratio being determined by the diameters of the pinions 17 relative to the fixed gear 18. However, mechanisms for this purpose, as also the means for reversing the traverse of the winding drum at the end of each helical layer of the wire, are well known in the art.

The matter of lateral traverse of the drum is important in the present connection for a peculiar reason, which I will explain. The flat or cut side of the wire x is presented in contact with the weighted rollers 8, 8ᵃ, 8ᵇ, etc., and I have discovered that the wire behaves all right because these wheels have no lateral traverse. In case of the final wheel 8ʰ, however, the traverse of the drum seems to introduce an irregularity of operation whereby the end traction, or a lateral component due to the traverse of the drum, operates to put a permanent twist in the wire producing irregularities in the helical layers on the traction drum 13. Irregularities in the layers seem to introduce various difficulties, including unsteady traction, slipping and vibration of the wire. These are transmitted through the wires to the traction wheels where the cutters are operating, thus causing irregularity in the functioning of the latter. I have discovered that these irregularities can be entirely corrected by employing the intermediate guide wheel 12, thus causing the cylindrical rear face of the wire, to be the one through which transverse pressure is applied, both for the wind up drums and for the next preceding roll.

Fig. 2 indicates how two parallel wires may be operated upon at the same time by providing a second supply drum 1ᵃ and guide wheel 6ᵃ at the entrance end of the machine and, at the far end of the machine, a traction wheel 13ᵃ drawing the wire around roller 12ᵃ and weighted wheel 8ˣ.

A wheel unit for Figs. 1 and 2 is shown more in detail in Figs. 3, 4 and 5 and a preferred form of wheel in Fig. 15.

In the forms shown in Figs. 3, 4 and 5, the unit comprises a well braced frame, comprising standards 20, 21 and 22, horizontally connected through longitudinal members 23, 24, 25 and 26. The standard 21 carries a journal box comprising two sections 30, 31, secured by bolts 32, 32 and serving as a mounting for shaft 33. Shaft 33 carries the tractor wheel, in this case shown as comprising a heavy rim 40 supported by radial spokes 41, 41, projecting from hub 42.

Secured on the top of standards 20, 22 by bolts 51, 51, is a V braced member 52, 52, having at the upper end a seat 53, for anchoring a semi-circular cutter support 60, which is detachably secured to it by bolts 61 at the top, 62, 62, at one end and 63, 63 at the other end. This semi-circular support is located close to the periphery of wheel 40 and is formed with a multiplicity of spaced holes 64 for securing a large number of cutting tools in operative relation to the wire on the periphery of the wheel 40. Cutters and cutter holders are diagrammatically indicated at a few points around the periphery as at 66ᵃ, 66ᵇ, 66ᶜ, 66ᵈ, etc. (These are shown in detail in Figs. 6, 7 and 8.)

As may be seen from Figs. 4 and 5, the shaft 33 is supported at its other end by a frame work and journal box similar to that described in connection with Fig. 3. Outside of this journal box, 31ᵃ, the shaft is provided with a worm gear 34, driven through a worm 35, by electric motor 36.

As shown in Fig. 5 and as indicated in dotted lines in Fig. 4, the back side of the wheel 40 may be closed in by a hood comprising two sections 37, 37ᵃ, secured to each other by bolts 38 and to the frame by bolts 39, shown in Fig. 4ᵃ. As indicated in Fig. 5, there is an inner wall 39ᵃ, parallel with 37, 37ᵃ, so that the interspace is an annular conduit, the mouth of which is brought close up to and registers with the periphery of the wheel, 40, to receive the steel fiber or wool as it is removed from the knives.

The means for removing the fiber includes a series of air jets, discharged through pipes 70, which are connected with a semi-circular supply pipe 71, through which the air is forced from a suitable source, preferably a pressure blower, not shown. The force of the blast may vary with the position of the nozzles and in general will be less powerful for the finer gauges of steel wool. For instance, for very fine fiber, a nozzle pressure of about 3 lbs. will be suitable for effectively removing the strands as they curl up from the knife, while yet gently enough to stream them across into the hood in the longest possible lengths. For coarser fiber, a nozzle pressure of 6 lbs. or more may be desirable.

The supply pipe 71 is detachably held intermediate its length by clips 72, and at the supply end there is a readily detachable screw coupling 73, which will be disconnected when the supply valve 74 has been turned off.

The knives 66ª, 66ᵇ, etc., being automatically self adjusting in their relation to the wire, the entire bank of knives can be applied or removed as a unit. In order to remove one set and replace another, it is only necessary to detach the air supply pipe 71, which carries the nozzles 70; then unscrew bolts 61, 63 and then lift the semi-circular support 60 out of position. This may be effected by any suitable means, as for instance, a hoist carried by an overhead trolley, not shown; the eyes 76, 76 being provided for engagement by lifting hooks. A substitute unit can be replaced by reversing the above described steps, the knives automatically accommodating themselves to the work when the support 60 is secured in proper position.

The construction of the knives and knife-holders whereby they are adapted for the above described automatic adjustment will be evident from Figs. 6, 7 and 8. Each hole 64 in the knife support 60 has a stud shaft 80 secured therein by screw shank 81, which may be of steel. Fitting this is a brass bushing 82 serving as the bearing surface for the hub portion 83 of the tool holder. This bearing is of large diameter and great length and the bearing surfaces are a very close fit in order to eliminate all traces of lost motion, to the greatest extent possible. As a further precaution, there is a friction bearing ring 84 pressed against the hub by thrust screws 85 supported in a flange head 86, screw-threaded on stud projection 87 and held in fixed position by lock nut 88. The screws 85 may be set up as tightly as required for the above purpose and also for another purpose about to be described.

The foregoing characteristics of the hub journal including the friction ring 84 have the other and equally important function of affording adjustable frictional damping, opposing rotary vibratory movements of the knife-carrying arm. This includes a massive portion 90 integral with the hub having a very massive laterally extending portion 91, which, toward the end, is reduced to a somewhat lighter though still heavy section as indicated at 92. The part 92, extending considerably inward from the end thereof, has a slot 93, for holding the knife 94, which is rigidly secured in any desired position of adjustment by thumb-set-screw 95.

The hub 83 has another arm 97 carrying a weight 98, which is out of line with the perpendicular plane passing through the axis of 80 so that the cutting edge of the knife is yieldingly pressed forward and downward. As the amount of this pressure should be predetermined for particular cases and as the angular relation of the weight to produce a given pressure depends on the angular position of the knife around the semi-circle of support 60, the weight arm is hinged on pivot screw 99 and held by wing nut 100, which may be loosened or tightened to secure the weight in any desired position of angular adjustment.

The knife-holder is preferably provided with a hole 101 and the periphery of the knife carrier with a hole 102, which holes are adapted to register so that when the knife-holder is swung backward out of operative position, a pin 103 may be inserted to hold it in that position as long as desired.

As shown in Fig. 9, the wheel 40 is of such great diameter that its curvature is negligible so far as concerns the operation of the knife 94 on the wire and as shown in Fig. 3, the pressure of knives operating at the vertical points in the wheel as 66ª, 66°, may have the effective pressures on the knives adjusted, by pivoting the weights 98 to any desired position with respect to the pull of gravity.

With a knife having a cutting edge with, say, 190 V-serrations per inch, having a 36 degree bevel and inclined 11 degrees to the wire, as indicated in Fig. 9, it was found that a weight of 10 pounds for the tool holder affords the desired inertia. Fine results were obtained when the effective power arm due to eccentricity of the weight 98, was about 2¾ inches and the weight itself 4¼ pounds plus about one pound for the power arm, the frictional damping through ring 84, being properly adjusted by screws 85. Where the same number of pounds counter-balance of thrust was obtained by a power arm 8 inches long with proportionally less weight, the wool was not as long fiber or as good quality as with the shorter arm with greater weight. This illustrates the value of the inertia factor of counter-balance against knife reaction.

It is to be noted that coarser serrations, grooving more deeply into the wire, will afford greater rearward thrust and will require greater weight or greater eccentricity for the weight 98.

In this connection, it is desirable to explain that although geometrical perfection of the V-shaped cutting edge of the knife would seem inevitably to result in a downward wedging component whereby the knife would automatically dig into the wire and cut it off, it is a fact that for the angles shown in Fig. 9 there is no digging-in tendency. On the contrary, there is reaction of the moving wire on the knife that yields an upward resultant. This is partly because the thrust on the knife has a very large component perpendicular to the radius of movement about the pivot 80 and any rotation of the knife carrier in this direction tends to carry the edge of the knife upward and away from the wire, as shown in Fig. 7ᵃ. However, this is not the only upward effect, because I find that it is practicable though less desirable to locate the axis of pivotal movement in line with the thrust of the knife. In this case also there is an upward component which must be counterbalanced by the eccentric weight to keep the floating knife in operative relation to the wire, and this appears to be derived from upward reaction of the wire on the V-shaped serrations.

My theory is that when the knife is beveled back at a 36 degree angle, as indicated in Fig. 9, the steel at the extreme edges of the intersecting planes cannot be a mathematical line and considered from the viewpoint of 1/10,000 inch measurements, is in fact an extremely minute skate or ski point. Whatever may be the theory or the fact, there is this unexpected upward reaction of the wire upon the knife that makes my floating knife possible. The reason the edge automatically gauges depth with such great accuracy is that the upward component increases at a very definite ratio to increase of depth of penetration of the V point knife. Consequently, with sufficient inertia backing, and with sufficient friction damping, the gauging is more accurate than can be secured in practice with a perfectly solid bed and a knife as rigid as possible.

In Figs. 10 and 11, I have indicated a novel feature or aspect of my invention which applies where successive bed grooves are employed for successive cutting operations on the same wire and it is of special advantage where the wire is stiff and heavy. In all prior machines it has been customary to make the bed grooves of uniform depth and shallow enough to properly present the wire to the knife edge when it is thinnest, just before scrapping, and this necessitates a groove so shallow that during the first cuts when the wire is stiffest, it is easily displaced from the groove. To avoid this, I provide a series of bed grooves of different depths, the first groove being deep, preferably as much as a half diameter of the wire, as shown in Fig 10, the other grooves for the subsequent cuts being progressively shallower as required by the decreasing thickness of the wire, the last groove being extremely shallow as shown in Fig. 11. In the latter figure, it will be seen that the wire is so thin that even a shallow groove affords a very stable base of support against the thrust of the knife.

Figs. 12, 13 and 14 correspond to Figs. 6, 7, and 8, respectively, but differ therefrom in that the eccentric weight 98ᵃ is in the form of a piston head freely slidable into dashpot cylinder 98ᵇ. This cylinder may be filled with oil or other liquid or air, which must escape from the upper to the lower side of the piston 98ᵃ or, vice versa, whenever there is rotary movement of the knife holder 90 about pivot 80. Holes 98ᶜ through the piston, or even a loose fit of the piston, will determine the resistance and the time required for such flow. Hence the damping of the knife holder movement will be determin by this factor either alone or in combination with the friction collar above described.

The wheel shown in Fig. 15 is desirable for use as a bed for either fixed or floating knives and as a substitute for the traction wheels shown in the preceding figures. A desirable embodiment consists of a large thin disc 130 which may be, say, 9 feet in diameter. The face 131 on the knife-holder side is a plane while the opposite face 132, preferably tapers from the hub 133 to the periphery 134. For a nine-foot wheel the peripheral face may be an inch wide and the disc at the point where it curves into the hub may be 1-1/2" thick. For a wheel of the above size, the hub 133 may be 15 inches long by 15 inches in diameter. The disc will be near one end of the hub and there are radial stiffening ribs 135 springing from the remote end of the hub and tapering more or less uniformly towards the periphery. The hub is interially coned from about 6 inches diameter at 136, to about 5/8" larger at 137. The shaft 138 has a corresponding cone portion 139. This taper is so fine and the surface so large that the disc may be secured to the shaft by drive-fit, after which the periphery may be refinished for more accurate centering on the axis of shaft 138.

The above construction permits casting the wheel with very little liability of warping or changing shape after machining. The shaft is rotatably mounted in standards 140, 141, corresponding to standards 21, 30, 31 of the preceding figures.

Such a wheel may be used either with fixed knives, or in combination with my floating knives, as a rotary bed over which the wires may be dragged by traction reel, operating very much as in present day commercial machines, except that the traction on the wire and the pressure of the knives operate to cause rotation of the disc without slip of a wire. It will be found, however, that where the disc is of large size, suitable for accommodating 40 to 60 knives, it is highly desirable to use the wheel as a traction wheel through which power is applied to the wire to assist end-traction, in the manner previously described. For such use an important feature of my invention consists in employing a flexible coupling, in this case indicated as comprising discs 150, 151, connected by groups of leaf springs 152 after the manner of one of the well known couplings now obtainable in the market. This tends to insulate the shaft 138 from extension 138$^a$ which is driven by worm gear 153 secured thereto by spline 154. The advantage of the worm gear has been explained above.

By reference to Fig. 6, it will be seen that the lefthand nozzle 70 is located a little farther aft than the righthand nozzle 70, these parts being flexible copper tubes that may be directed variously to suit the conditions for individual knives. One of the conditions seems to be having a certain amount of the air impinge on the cutting edge from the rear in order to prevent occasional accumulations of fiber tending to clog the knife. As it is not always easy to arrange a single jet to serve both the front-float function and the rear-clearance function, I sometimes find it desirable to employ another nozzle, as 70$^a$, directed upon the left knife from the rear, preferably at an angle of from 45 to 60 degrees to the cutting edge of the knife. The composite blast derived from rearwardly directed nozzle 70$^a$, at the right, with that from transverse nozzle 70, at the left, can be adjusted to serve both purposes more perfectly, besides having greater cooling effect on the cutting edge.

Referring again to Figs. 1 and 3, it will be evident that the motors, 10 to 10$^h$, of the traction wheels and also the motor 14 of the end traction reel should have their speeds controlled so that the weighted guide-rollers, 8 to 8$^h$, will float in a midway position on the loops of wire between traction wheels 7 to 7$^h$. While springs or mechanical movements may be employed to apply increased resistance toward the upper and lower positions of the gravity rollers, I find it possible to obtain an analogous result by having the rollers 8, 8$^a$, etc., of somewhat greater diameter than the space between the adjacent traction wheels 7, 7$^a$, etc. This causes the legs of the wire loop to converge upwardly, and the higher the roll 8 rises the sharper will be the angle of convergence and the less effective will a given traction be in causing further upward movement of the wheels. Divergence of the legs of the loop would have a similar effect, but with a less sharply defined upper limit for the movement.

If abnormal conditions cause one traction wheel to rotate faster than the others, the gravity roller on the supply side will rise so as to cause the traction of the faster wheel to take effect on the slower wheel that is feeding into it, while the gravity roller on the winding reel side will fall, thereby removing tension on the supply passing to the slower traction on that side. These effects will be a maximum when the gravity rolls reach the respective top and bottom of their slides. In preferred operation, however, such tendencies will be corrected by the operator through the motor controllers before extreme conditions are established.

The respective motors will be energized in accordance with the resistance applied by the knives at the periphery of each, to the end that the speeds of all the traction rollers will be the same and the height of all of the gravity rollers 8 will be approximately the same. This requires that the end traction by motor 14 also be adjusted.

While the adjustment of motor speeds may be effected by individual rheostats controlled by an operator in accordance with the observed rise or fall of the individual gravity rollers 8 to 8$^h$, I prefer a series parallel control system permitting simultaneous or coordinated stopping and starting of the machine, in addition to the individual adjustment of each motor for constant speed which is substantially the same as that of each other motor.

The system shown in Fig. 16, in so far as concerns the series-parallel starting switch, can be sufficiently indicated by resistance box R, having a controller handle R$^1$ and contacts R$^2$ of any known or desired construction for controlling simultaneous energization of all the motors, 10 to 10$^h$. The motors, 10 to 10$^h$, have windings designed for constant speed as, for instance, by having one field winding $w$, in series with the armature and another field winding $w'$ in shunt; but the end traction motor 14 is preferably designed for constant torque by having all the field winding $w^2$ in series with the armature. The individual controls for motors 10 to 10$^h$, for constant speed, are by adjustable resistances $r$, $r^1$, $r^2$, etc., controlling the shunt windings $w'$, while the resistance $r^{14}$ controls the series field winding of end traction motor 14. There are hand switches $s$, $s$, $s$, controlling the parallel circuits to these resistances, from circuit wires 200, 201.

The motors are further controlled by friction brakes diagrammatically indicated at B, B, B, etc., as having springs $b$, $b$, $b$, etc., normally tending to apply the brakes and electromagnetic solenoids, $b'$, $b'$, $b'$, etc., for releasing them.

The supply of current to wires 200 and 201 is derived from any suitable source represented by the terminals $k$, $l$, through a hand switch $l'$, suitable fuses being interposed if desired. The conductors $k^2$, $l^2$ lead to terminals $k^3$, $l^3$, of a double pole cut-out of well known construction, having potential coils $p$ operating on fall of potential and current coils $o$, operating on current overload to break the circuit between terminals $l^3$, $l^4$ and $k^3$, $k^4$, respectively.

From $k^2$ there is a branch leading to contacts of the circuit breaker $q$ with a shunt path through $k^6$ to terminal $k^7$, which is a shoe in contact with the wire $x$ at the feeding-in end of the machine. The wire forms a conducting path from terminal $k^7$ to $k^8$, thence through $k^{10}$ to $l^7$, which is conductively connected to the other side of the supply line at $l^2$. When the wire $x$ is in position and the switch $l'$ is closed, the circuit breaker $q$ is energized, closing the shunt from $k^2$ through bridge-piece $q'$ and conductor $k^{11}$ and thence through coils $p, p$, to the other side of the supply at $l^2$. Then the cut-out switch being closed by hand to bridge contacts $l^3, l^4$ and $k^3, k^4$, respectively, the current flows through the overload coils $o, o$ to the supply wires 200, 201.

When a wire runs out or breaks at $x$, the circuit of coil $q$ is deenergized, the bridge $q'$ falls, thus breaking the supply circuit. Too much current in series coils $o$ or too low potential in coils $p$ will operate to break the circuit at $k^3, k^4$ and $l^3, l^4$.

With this system the wire will be threaded into the machine, the switch $l'$ will be closed, as also the cut-out at $k^3, l^3$. Then, the switch $s$ of end-traction motor 14 being closed, the controller handle R' will be rotated to energize field coils $w, w$, and the armatures of motors 10 to $10^h$ and motor 14 and to release the friction brakes B, B. Thereupon all motors will operate with constant torque tendency. The other switches $s, s$, etc., being then closed, motors 10 to $10^h$ will have a constant speed tendency, individual speeds will be equalized by hand adjustment of resistance $r, r'$, etc., and the speeds for the whole system will be regulated by further adjustment of the main controller lever R'.

It will be understood that when any cutter fails to function properly, the operator merely pushes it back and secures it as shown in Fig. 7ª, because in most cases it will be found undesirable to insert new cutters during operation of the machine. When the wire runs out and new wire is being welded on there is a period of idleness during which all of the cutters on one traction wheel may be changed by removing the tool frame and inserting a new one. This makes it possible to have two tool frames for each shaving drum, one of which will be in the grinding room having its dull cutters removed and sharpened and replaced while the other is in service. If desired, all of the tool frames for all of the traction wheels may be changed at the same time.

One advantage of the arrangement shown in Figs. 1 and 2 is that the coarser fibers or shavings such as are taken off by knives having, say, 30 serrations per inch, will always be taken off by knives at the feed-in end of the machine, while the successively finer grades, produced knives having serrations, respectively 54, 80, 100, 133, etc., up to 240 per inch, will also be taken off at other definite points further on in the machine.

I claim:

1. A machine for grooving fibers from metal, including means for supporting and feeding the metal, a grooving knife having a serrated and beveled cutting edge and a movably mounted knife-holder presenting the serrations of the knife to the metal at acute cutting angles affording a lifting reaction on the serrations the amount of which depends upon depth of the cut, and means for applying uniform pressure opposing such reactions non-positively and to a limited extent to permit balanced, self gauging action of the cutting edge at a desired depth less than the depth of the serrations.

2. A machine for grooving fibers from metal, including means for supporting and feeding the metal, a grooving knife having a serrated and beveled cutting edge and a movably mounted knife-holder presenting the serrations of the knife to the metal at acute cutting angles affording a lifting reaction on the serrations the amount of which depends upon depth of the cut, and means for applying uniform pressure opposing such reactions non-positively and to a limited extent to permit balanced, self gauging action of the cutting edge at a desired depth less than the depth of the serrations, said means including a predetermined mass or inertia element rigid with and close to the knife.

3. A machine for grooving fibers from metal, including means for supporting and feeding the metal, a grooving knife having a serrated and beveled cutting edge and a movably mounted knife-holder presenting the serrations of the knife to the metal at acute cutting angles affording a lifting reaction on the serrations the amount of which depends upon depth of the cut, and means for applying uniform pressure opposing such reactions non-positively and to a limited extent to permit balanced, self gauging action of the cutting edge at a desired depth less than the depth of the serrations and frictional damping means for opposing vibratory movements of the knife.

4. A machine for grooving fibers from metal, including means for supporting and feeding the metal, a grooving knife having a serrated and beveled cutting edge and a movably mounted knife-holder presenting the serrations of the knife to the metal at acute cutting angles affording a lifting reaction on the serrations the amount of which depends upon depth of the cut, and means for applying uniform pressure opposing such reactions non-positively and to a limited extent to permit balanced, self gauging action of the cutting edge at a desired depth less than the depth of the serrations, said means including a predetermined mass or inertia element rigid with and close to the knife, and frictional damping means for opposing vibratory movements of the knife.

5. A machine for grooving fibers from metal, including means for supporting and feeding the metal, a grooving knife having a serrated and beveled cutting edge and a movably mounted knife-holder presenting the serrations of the knife to the metal at acute cutting angles affording a lifting reaction on the serrations the amount of which depends upon depth of the cut, and means for applying uniform pressure opposing such reactions non-positively and to a limited extent to permit balanced, self gauging action of the cutting edge at a desired depth less than the depth of the serrations, said means including an eccentric weight and frictional damping means for opposing vibratory movements of the knife.

6. A machine for grooving fibers from metal, including means for supporting and feeding the metal, a grooving knife having a serrated and beveled cutting edge and a movably mounted knife-holder presenting the serrations of the knife to the metal at an acute cutting angle affording a lifting reaction on the serrations the amount of which depends upon depth of the cut and means including an eccentric weight and frictional damping means opposing such reactions non-positively and to a limited extent to permit balanced, self gauging action of the cutting edge at a desired depth less than the depth of the serrations.

7. A machine for grooving fibers from metal, including means for supporting and feeding the metal, a grooving knife having a serrated and beveled cutting edge and a pivotally mounted knife-holder presenting the cutting edge of the knife to the metal at an acute cutting angle affording a lifting reaction on the serrations the amount of which depends upon depth of the grooves, and means for partially counterbalancing such reactions about the axis of the pivot to permit balanced, self gauging action of the cutting edge at a desired depth less than the depth of the serrations.

8. A machine for grooving fibers from metal, including means for supporting and feeding the metal, a grooving knife having a serrated and beveled cutting edge and a pivotally mounted knife-holder presenting the cutting edge of the knife to the metal at an acute cutting angle affording a lifting reaction on the serrations the amount of which depends upon depth of the grooves, and means for partially counterbalancing such reactions about the axis of the pivot to permit balanced, self gauging action of the cutting edge at a desired depth less than the depth of the serrations, said means including a predetermined mass or inertia for the pivotally moving elements of the knife-holder and an eccentric weight rigidly associated therewith.

9. A machine for grooving fibers from metal, including means for supporting and feeding the metal, a grooving knife having a serrated and beveled cutting edge and a pivotally mounted knife-holder presenting the cutting edge of the knife to the metal at an acute cutting angle affording a lifting reaction on the serrations the amount of which depends upon depth of the grooves, and means for partially counterbalancing such reactions about the axis of the pivot to permit balanced, self gauging action of the cutting edge at a desired depth less than the depth of the serrations, said means including a predetermined mass or inertia for the pivotally moving elements of the knife-holder and an eccentric weight rigidly associated therewith, and frictional damping means for opposing vibratory movements of the knife.

10. A machine for grooving fibers from metal, including means for supporting and feeding the metal, a grooving knife having a serrated and beveled cutting edge and a pivotally mounted knife-holder presenting the cutting edge of the knife to the metal at an acute cutting angle and affording a thrust out of alignment with axis of the pivotal mounting and tending to lift the serrations out of the metal, in combination with means for partially counterbalancing the lifting effects, to permit balanced, self gauging action of the cutting edge at a desired depth less than the depth of the serrations.

11. A machine for grooving fibers from metal, including means for supporting and feeding the metal, a grooving knife having a serrated and beveled cutting edge and a pivotally mounted knife-holder presenting the cutting edge of the knife to the metal at an acute cutting angle and affording a thrust out of alignment with axis of the pivotal mounting and tending to lift the serrations out of the metal, in combination with means for partially counterbalancing the lifting effects, to permit balanced, self gauging action of the cutting edge at a desired depth less than the depth of the serrations, said means including predetermined mass or inertia elements including an eccentric weight.

12. A machine for grooving fibers from metal, including means for supporting and feeding the metal, a grooving knife having a serrated and beveled cutting edge and a pivotally mounted knife-holder presenting the cutting edge of the knife to the metal at an acute cutting angle and affording a thrust out of alignment with axis of the pivotal mounting and tending to lift the serrations out of the metal, in combination with means for partially counterbalancing the lifting effects, to permit balanced, self gauging action of the cutting edge at a desired depth less than the depth of the serrations, said means including predetermined mass or inertia elements including an eccentric weight; together with frictional damping means for opposing vibratory movements of the knife.

13. A machine for grooving fibers from metal, including means for supporting and feeding the metal, a grooving knife having a serrated and beveled cutting edge and a holder permitting automatic movement of the cutting edge to vary the depth of cut and affording an outward or floating resultant for the knife edge and means for non-positively applying a limited pressure to permit balanced, self gauging operation of the cutting edge at a desired depth less than the depth of the serrations.

14. A machine for grooving fibers from metal, including means for supporting and feeding the metal, a grooving knife having a serrated and beveled cutting edge and a holder permitting automatic movement of the cutting edge to vary the depth of cut and affording an outward or floating resultant for the knife edge and means for non-positively applying a limited pressure to permit balanced, self gauging operation of the cutting edge at a desired depth less than the depth of the serrations, said means including predetermined mass or inertia elements, an eccentric weight and frictional damping means for opposing vibratory movements of the knife.

15. A machine for making metal wool from wire, including a plurality of grooving units each having a plurality of grooving knives, said units being arranged in series for simultaneous operation on successive portions of the same length of wire, in combination with means for applying traction to the wire at a plurality of points intermediate the ends of the machine.

16. A machine for making metal wool from wire, including a plurality of grooving units each having a plurality of yieldingly mounted grooving knives, said units being arranged in series for simultaneous operation on successive portions of the same length of wire, in combination with means for applying end traction at the end of the machine.

17. A machine for making metal wool from wire, including a plurality of grooving units each having a plurality of grooving knives, said units being arranged in series for simultaneous operation on successive portions of the same length of wire, in combination with means for applying traction to the wire at a plurality of points intermediate the ends of the machine and means for applying end traction at the end of the machine.

18. A machine for making metal wool from wire, including a large diameter rotor serving as a rotating cutting bed traveling with the wire and a multiplicity of grooving knives supported in operative relation to the periphery of said rotor, in combination with means for non-positively applying practically constant end traction on said wire and non-positive means tending to rotate said rotor at constant speed.

19. A machine for making metal wool from wire, including a large diameter rotor serving as a rotating cutting bed traveling with the wire and a multiplicity of grooving knives supported in operative relation to the periphery of said rotor, in combination with means for applying end-tension on the wire to maintain the wire in normally non-slip engagement with the periphery of the said rotor.

20. A machine for making metal wood from wire, including a large diameter rotor serving as a rotating cutting bed traveling with the wire and a multiplicity of grooving knives supported in operative relation to the periphery of said rotor, in combination with means for applying end-tension on the wire to maintain the wire in normally non-slip engagement with the periphery of the said rotor, said means including a power driven winding reel and a pressure roll floating on the wire between the rotor and the winding reel.

21. A machine for making metal wool from wire, including a large diameter rotor serving as a rotating cutting bed traveling with the wire and a multiplicity of grooving knives supported in operative relation to the periphery of said rotor, in combination with means for applying end-tension on the wire to maintain the wire in normally non-slip engagement with the periphery of the said rotor, and means having a constant speed tendency for driving the rotor.

22. A machine for making metal wool from wire, including a large diameter rotor serving as a rotating cutting bed traveling with the wire and a multiplicity of grooving knives supported in operative relation to the periphery of said rotor, in combination with means for applying end-tension on the wire to maintain the wire in normally non-slip engagement with the periphery of the said rotor, including a winding reel and means for applying approximately constant torque thereto.

23. A machine for making metal wool from wire, including a large diameter rotor serving as a rotating cutting bed traveling with the wire and a multiplicity of grooving knives supported in operative relation to the periphery of said rotor, in combination with means for applying end-tension on the wire to maintain the wire in normally non-slip engagement with the periphery of the said rotor, said means including a power driven winding reel and a pressure roll floating on the wire between the rotor and the winding reel, and means having a constant speed tendency for driving the rotor.

24. A machine for making metal wool from wire, including a plurality of tractor rotors arranged in series and each having a multiplicity of grooving knives in operative relation thereto, tension rollers riding in loops between the tractor wheels to take up slack between them and an end traction winding reel applying a predetermined end tension to keep the wire in close frictional engagement with the tractor wheels and the tension rollers.

25. A machine for making metal wool from wire, including a large diameter rotor having a grooved periphery supporting and feeding wire in operative relation to a multiplicity of grooving knives, the knives being movably mounted and their cutting edges automatically self gauging or floating with respect to the wire, in combination with a rigid support for a multiplicity of said knives whereby they may be applied to and removed from the machine in operative relation to the wire without adjustment for the individual knives.

26. A machine for making metal wool from wire, including means for supporting and guiding the wire and a multiplicity of knives having serrated cutting edges and pivotally mounted for balanced, self gauging grooving of the wire to a depth less than the depth of the serrations, a multiplicity of said knives being mounted as interchangeable gang units having a single removable and replaceable support forming part of the machine.

27. A machine for making metal wool from wire, including a large diameter rotor mounted on a horizontal axis and having a grooved periphery serving as a rotating cutter bed, in combination with a multiplicity of yielding cutting knives arranged in a semi-circle about the upper half of the periphery of said rotor.

28. A machine for making metal wool from wire, including a large diameter rotor mounted on a horizontal axis and having a grooved periphery serving as a rotating cutter bed, in combination with a multiplicity of cutting knives arranged in a semi-circle about the upper half of the periphery of said rotor, a multiplicity of said knives being mounted as interchangeable gang units having a single removable and replaceable support forming part of the machine.

29. In a machine for making metal wool from wire, a multiplicity of shaving knives, in combination with a rotary guide and cutter bed for the wire, including a relatively thin cast metal disc of large diameter, said disc being mounted on a horizontal axis and having a grooved periphery.

30. In a machine for making metal wool from wire, a multiplicity of shaving knives, in combination with a rotary guide and cutter bed for the wire, including a relatively thin cast metal disc of large diameter, said disk being mounted on a horizontal axis and having radial stiffening ribs on one face.

31. In a machine for making metal wool from wire, a multiplicity of shaving knives, in combination with a rotary guide and cutter bed for the wire, including a relatively thin cast metal disc of large diameter having radial stiffening ribs on one face and the other face being plane, said disc being mounted on a horizontal axis and having a grooved periphery.

32. In a machine for making metal wool from wire, a multiplicity of shaving knives, in combination with a rotary guide and cutter bed for the wire, including a relatively thin cast metal disc of large diameter and a massive hub having a coned interior of very slight taper and a shaft having corresponding taper on which said hub is drive-fitted.

33. In a machine for making metal wool from wire, a multiplicity of shaving knives, in combination with a rotary guide and cutter bed for the wire, including a relatively thin cast metal disc of large diameter and a massive hub having a coned interior of very slight taper and a shaft having corresponding taper on which said hub is drive-fitted, and radial stiffening ribs integral with hub and disc.

34. In a machine for making metal wool from wire, a multiplicity of shaving knives, in combination with a rotary guide and cutter bed for the wire, including a relatively thin cast metal disc of large diameter and a massive hub having a coned interior of very slight taper and a shaft having corresponding taper on which said hub is drive-fitted, said disc being mounted on a horizontal axis and having a grooved periphery.

35. A rotor having its periphery formed for guide and support of wire, in combination with a multiplicity of serrated grooving knives which are mounted so that the cutting edges are self gauging for a predetermined depth of cut and means for applying power to drive said rotor, including a flexible coupling interposed between the rotor and the driving means.

36. A rotor having its periphery formed for guide and support of wire, in combination with a multiplicity of serrated grooving knives which are mounted so that the cutting edges are self gauging for a predetermined depth of cut and means for applying power to drive said rotor, including an electric motor, a worm gear and a flexible coupling between the rotor and the worm.

37. A machine for grooving metal wool from metal, including grooving knives and means for moving the metal in operative relation thereto, in combination with means for directing a jet of air along the cutting edge of the knife to non-positively draw the filaments away from the cutter as fast as they are grooved out of the wire.

38. A machine for grooving metal wool from metal, including grooving knives and means for moving the metal in operative relation thereto, in combination with means for directing a jet of air upon the cutting edge of the knife, from the rear.

39. A machine for grooving metal wool from metal, including grooving knives and means for moving the metal in operative relation thereto, in combination with means for directing a jet of air along the cutting edge of the knife to non-positively draw the filaments away from the cutter as fast as they are grooved out of the wire and for directing a jet of air upon the cutting edge of the knife, from the rear.

40. A machine for making metal wool from wire coils, including a supporting and guiding bed, grooving knives in operative relation thereto, in combination with means for applying end tension to the wire, including a winding reel and an electric motor for driving the latter; and automatic means for opening the supply circuit of said motor, including a circuit which serially includes a portion of the wire.

41. An automatic metal wool machine whereby the wire may be reduced to scrap at a single pass, including serially arranged units operating simultaneously on different portions of the length of the wire, as follows: tractor rotors having grooved peripheries for the wire and each having a multiplicity of independently movable, balanced, self-gauging grooving knives, a rigid semi-circular detachable member for each rotor supporting the knives in operative relation to the upper half of the periphery thereof, pressure rollers each riding in a loop of the wire between rotors, a winding reel beyond the last rotor and air jets for non positive traction of the steel wool fibers from the cutting edges of the knives, in combination with an electric drive and control system, including electric motors and circuits whereby the winding reel may be driven with independently-adjustable, constant-torque tendency and the traction rotors may be started with constant-torque tendency and then operated with independently-adjustable constant speed tendency.

42. An automatic metal wool machine whereby the wire may be reduced to scrap at a single pass, including serially arranged units operating simultaneously on different portions of the length of the wire, as follows: tractor rotors having grooved peripheries for the wire and each having a multiplicity of independently movable, balanced, self-gauging grooving knives, a rigid semi-circular detachable member for each rotor supporting the knives in operative relation to the upper half of the periphery thereof.

43. An automatic metal wool machine, whereby the wire may be reduced to scrap at a single pass, including serially arranged units operating simultaneously on different portions of the length of the wire, as follows: tractors having grooved peripheries for the wire and each having a multiplicity of independently movable, balanced, self-gauging grooving knives, in combination with an electric drive and control system including electric motors and circuits whereby the winding reel may be driven with independently-adjustable, constant-torque tendency and the traction rotors may be started with constant-torque tendency and then operated with independently-adjustable constant speed tendency.

44. A machine for making metal wool from wire, including a plurality of tractor rotors and cooperating grooving knives and an end traction drum serially arranged to operate simultaneously on different portions of the same length of wire, in combination with an electric drive and control system including electric motors and circuits whereby the end traction drum may be driven with independently-adjustable, constant-torque tendency and the traction rotors may be started with constant-torque tendency and then operated with independently-adjustable constant speed tendency.

45. A machine for making metal wool from wire, including a plurality of tractor rotors and cooperating grooving knives and a winding drum serially arranged to operate simultaneously on different portions of the same length of wire, a rigid semi-circular detachable member for each rotor supporting the knives in operative relation to the upper half of the periphery thereof and pressure rollers each riding in a loop of the wire between rotors.

46. A machine for making metal wool from wire, including a plurality of tractor rotors and cooperating grooving knives and a winding drum serially arranged to operate simultaneously on different portions of the same length of wire, pressure rollers each riding in a loop of the wire between rotors and air jets for non-positive traction of the steel wool fibers from the cutting edges of the knives.

47. A machine for making metal wool from wire, including a plurality of tractor rotors and cooperating grooving knives and a winding drum serially arranged to operate simultaneously on different portions of the same length of wire and air jets for non-positive traction of the steel wool fibers from the cutting edges of the knives.

48. A machine for making metal wool from wire, including a multiplicity of grooving knives and means for supplying adjacent parallel strands of wire in operative relation for simultaneous cutting of metal wool therefrom by each knife, the support means including a succession of grooves for successive cuts on the same wire, the first of said grooves being deep so as to properly guide and support the relatively stiff, full diameter wire and the subsequent grooves being of decreasing depths as required by the diminishing thickness of the wire.

49. A machine for making metal wool from wire, including grooving knives arranged for successive operation on a wire, in combination with means for moving the wire to present a plurality of adjacent parallel portions of the wire traveling in the same direction at approximately the same speed, so that each successive knife cuts wool from a plurality of said adjacent parallel portions of the wire simultaneously; said means for moving the wire including a plurality of tractor rotors and an end traction drum serially arranged so as to operate simultaneously on different portions of the same length of wire, in combination with an electric drive and control system including electric motors and circuits whereby the end traction drum may be driven with a desired constant torque tendency and the traction rotors may be operated with a desired constant speed tendency.

50. A machine for making metal wool from wire, including grooving knives arranged for successive operation on a wire, in combination with means for moving the wire to present a plurality of adjacent parallel portions of the wire traveling in the same direction at approximately the same speed, so that each successive knife cuts wool from a plurality of said adjacent parallel portions of the wire simultaneously; said means for moving the wire including intermediate means to apply traction upon the wire at a plurality of points within the machine and supplemental traction means to apply traction upon the wire from the exit end of the machine; together with means to drive said intermediate traction means at approximately constant speed, and means to drive said supplemental traction means to apply approximately constant end-tension on the wire.

Signed at New York in the county of New York, and State of New York, this 25th day of January, A. D. 1924.

CROSBY FIELD.